United States Patent
Brown et al.

(10) Patent No.: US 8,529,137 B2
(45) Date of Patent: Sep. 10, 2013

(54) RADIAL BEARING CAGE WITH CONTACT FEATURE

(75) Inventors: James Brown, Rock Hill, SC (US); Seth Claus, Charlotte, NC (US); Michael Turner, Fort Mill, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 469 days.

(21) Appl. No.: 12/758,444

(22) Filed: Apr. 12, 2010

(65) Prior Publication Data

US 2011/0249929 A1    Oct. 13, 2011

(51) Int. Cl.
  F16C 33/46  (2006.01)
  F16C 33/34  (2006.01)

(52) U.S. Cl.
  USPC ........... 384/572; 384/565; 384/580; 384/618; 384/623

(58) Field of Classification Search
  USPC ................ 384/513, 560, 565, 597, 572, 574, 384/584, 614, 618, 621, 623, 580
  See application file for complete search history.

(56) References Cited

U.S. PATENT DOCUMENTS

| | | | | |
|---|---|---|---|---|
| 3,144,284 A | * | 8/1964 | Ortegren | 384/574 |
| 3,644,006 A | * | 2/1972 | Feuillat et al. | 384/560 |
| 3,684,337 A | * | 8/1972 | Fransos et al. | 384/575 |
| 3,802,754 A | * | 4/1974 | Pitner | 384/580 |
| 4,154,491 A | * | 5/1979 | Derner et al. | 384/572 |
| 5,211,486 A | * | 5/1993 | Aqvist | 384/560 |
| 6,513,987 B2 | * | 2/2003 | Takahashi et al. | 384/574 |
| 7,837,394 B2 | * | 11/2010 | Takamizawa | 384/623 |
| 2004/0234184 A1 | * | 11/2004 | Koyama et al. | 384/572 |
| 2006/0126984 A1 | * | 6/2006 | Takamizawa | 384/572 |

FOREIGN PATENT DOCUMENTS

| | | | | |
|---|---|---|---|---|
| JP | 10252654 A | * | 9/1998 | |
| JP | 2003301848 A | * | 10/2003 | |
| JP | 2004176781 A | * | 6/2004 | |
| JP | 2005308138 A | * | 11/2005 | |
| JP | 2006132617 A | * | 5/2006 | |
| JP | 2007224977 A | * | 9/2007 | |
| JP | 2009074587 | * | 9/2007 | |
| JP | 2007333079 A | * | 12/2007 | |
| JP | 2008051161 A | * | 3/2008 | |
| JP | 2008-115930 A | * | 5/2008 | |
| JP | 2008-128356 A | * | 6/2008 | |
| JP | 2008175310 A | * | 7/2008 | |
| JP | 2008202797 A | * | 9/2008 | |
| JP | 2009058087 A | * | 3/2009 | |
| WO | WO 2005080812 A1 | * | 5/2005 | |
| WO | WO 2005080812 A1 | * | 9/2005 | |

* cited by examiner

*Primary Examiner* — Marcus Charles
(74) *Attorney, Agent, or Firm* — Lucas & Mercanti, LLP

(57) ABSTRACT

The bearing cage has a first flange, a second flange, and a plurality of cage bars extending between the first flange and the second flange so as to form and define outer boundaries for a plurality of pockets. The first flange and the second flange are each bent inward toward the pocket and then extend parallel in a vertical direction, forming a contact surfaces. The contact surfaces are in contact at each end of the rollers arranged in the pocket. The contact surfaces of the bearing cage present a large contact area between the ends of the rollers and the ends of the pockets where there is a lubricant film. Also, the surface of the contact surfaces is smooth.

6 Claims, 3 Drawing Sheets

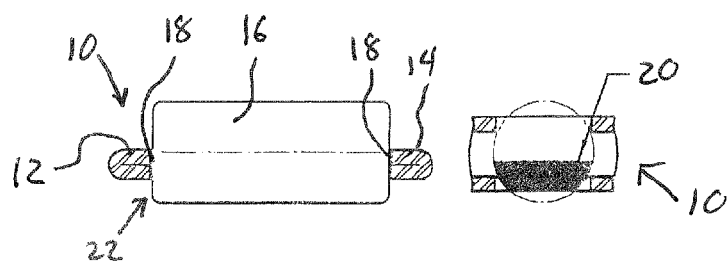
Fig. 1
Prior Art
Fig. 2
Prior Art
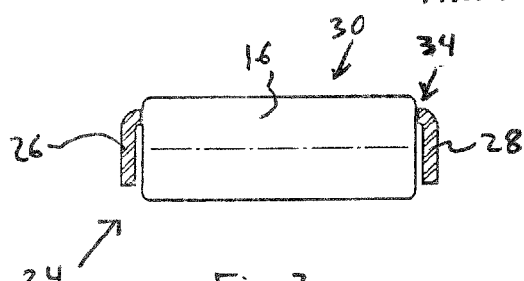
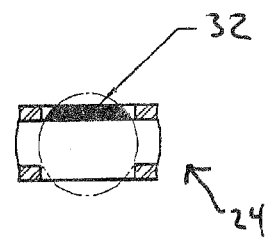
Fig. 3
Prior Art
Fig. 4
Prior Art
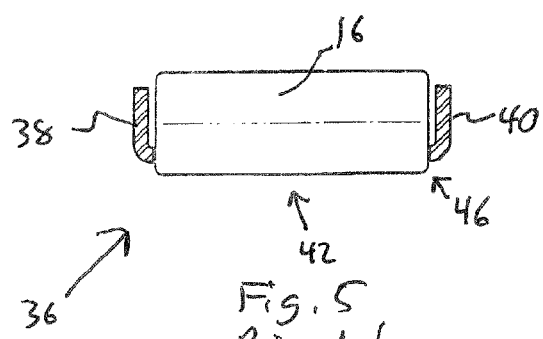
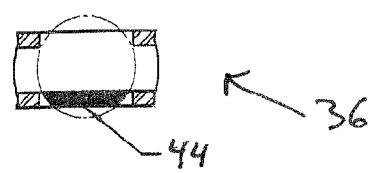
Fig. 5
Prior Art
Fig. 6
Prior Art

RADIAL BEARING CAGE WITH CONTACT FEATURE

FIELD OF INVENTION

The present invention relates to bearing cages and more particularly to providing a radial bearing cage with an increased contact area for rollers.

BACKGROUND OF THE INVENTION

Radial bearing cages typically consist of a first flange, a second flange, and web-like cage bars that connect the first flange and the second flange. The cage bars are created by piercing to provide a pocket for rollers, which are situated within the bearing cages. The cage bars retain, separate, and guide the rollers circumferentially and axially. Axially, the rollers are guided by the pierced ends of the pockets. Minimal contact area exists between the ends of rollers and the ends of pockets where lubricant film is present. The only surface in contact with ends of the rollers and the bearing cages is the pierced, shear zone surface.

Standard cage profiles, including straight cage profiles and cage profiles which resemble the letters B, W, M, V, A, and U in cross-section, as well as, "Pinched Cages" and "Staked Cages" are known and used in roller bearing applications. However, these current cage designs provide a minimal area of contact for ends of the rollers.

In an attempt to increase the contact area between the ends of rollers and the ends of the cage pockets, a design exists where the first flange and/or the second flange is/are bent and curled back on itself/themselves. However, the only surface of the flange(s) in contact with the end(s) of the rollers with this design is a pierced shear zone surface.

SUMMARY OF THE INVENTION

The present invention is directed to a bearing cage providing increased contact area between the ends of the rollers and the inside of the first flange and the second flange of the cage pockets. The first flange and second flange of the bearing cage have rims that are bent inward. The contours of the first flange and the second flange reduce the free space between the first flange and the second flange and the rollers, increasing the surface area where the rollers contact the pocket ends.

The present invention allows for a larger surface area contact between the ends of the rollers and the ends of the pocket for lubricant film. Additionally, unlike the existing pierced, shear zone surface, the present invention provides a smooth surface at the inside of the first flange and the second flange of the cage pockets for contact with the ends of the rollers.

The present invention may be used in any of the following configurations, among others: (1) as a cage-and-roller assembly only; (2) a cage-and-roller assembly with a machined or drawn outer raceway; (3) a cage-and-roller assembly with a machined or drawn inner raceway; or (4) any combination of (2) and (3). In the first configuration (1), machined or drawn inner raceway and a machined or drawn outer raceway are not required. In the second configuration (2), inner roller retention is not required. In the third configuration (3), outer roller retention is not required. In the fourth configuration (4), both inner roller retention and outer roller retention are required.

Broadly, the present invention can be defined as follows, a bearing cage, which comprises a pocket that has a first flange, a second flange, and a plurality of cage bars extending between the first flange and the second flange so as to form and define outer boundaries for a plurality of pockets. The first flange and the second flange each are bent inward toward the pockets and then extend parallel in a vertical direction, forming contact surfaces.

In a further embodiment, the bearing cage is a radial bearing cage.

In another embodiment, a roller, which has ends, is arranged in each of the pockets.

In yet another embodiment, the contact surfaces of the first flange and the second flange are in contact with the rollers.

In a further embodiment, a lubricant film is present between the ends of the roller and the contact surfaces.

In yet a further embodiment, the first flange and the second flange each have an inner face and an outer face, the inner face having a smooth surface.

BRIEF DESCRIPTION OF THE DRAWINGS

The present invention will be further understood and appreciated by reading the following description in conjunction with the accompanying drawings, in which:

FIG. 1 is a cross-sectional view illustrating an existing bearing cage design with a roller;

FIG. 2 is an end view illustrating the area where a roller contacts the end of the existing bearing cage pocket;

FIG. 3 is a cross-sectional view illustrating a standard "M" cage with a roller;

FIG. 4 is an end view illustrating the existing standard "M" cage showing the area of the cage where the roller contacts the end of the cage;

FIG. 5 is a cross-sectional view illustrating a standard "W" or "U" cage with a roller;

FIG. 6 is an end view illustrating the existing standard "W" or "U" cage showing the area of the cage where the roller contacts the end of the cage;

DETAILED DESCRIPTION OF THE INVENTION

Figures 7, 8:
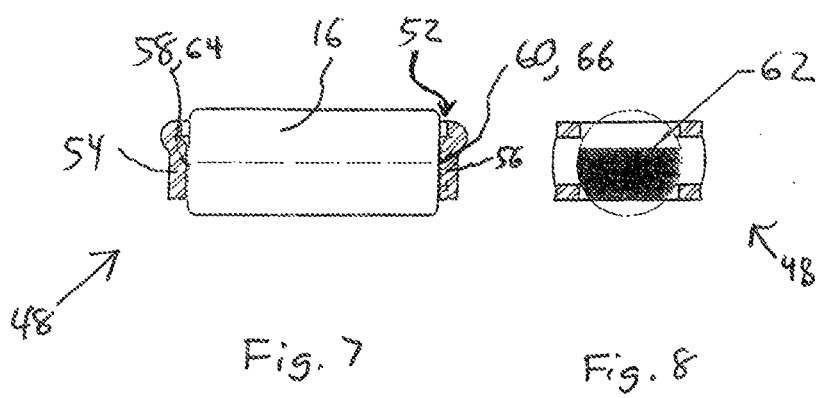
FIG. 7 is a cross-sectional view illustrating the inventive bearing cage.
FIG. 8 is an end view illustrating the bearing cage of FIG. 7 showing the area of the cage where the roller contacts the end of the cage.

Referring now to the drawings, in which like reference numerals refer to like reference parts throughout, FIG. 1 shows a cross-sectional view of an existing bearing cage 10. The bearing cage 10 has an first flange 12 and an second flange 14 that are both bent and curled inward. The only surface of cage 10 in contact with a roller 16 is a pierced, shear zone surface 18.

FIG. 2 shows an end view of the existing cage 10 and the area 20 where the roller 16 contacts the shear zone surface 18 at the first flange 12 and the second flange 14. This configuration provides minimal contact between the roller 16 and the cage pocket end 22.

FIG. 3 shows a cross-sectional view of an existing standard "M" cage 24, which has an first flange 26 and an second flange 28, with a roller 16 positioned in a cage pocket 30.

FIG. 4 shows an end view of the standard "M" cage 24 and the area 32 where the roller 16 contacts a cage pocket end 34 at the first flange 26 and the second flange 28. This configuration provides minimal contact between the roller 16 and the cage pocket end 34.

FIG. 5 shows a cross-sectional view of an existing standard "W" or "U" cage 36, which has an first flange 38 and an second flange 40, with a roller 16 positioned in a cage pocket 42.

FIG. 6 shows an end view of the standard "W" or "U" cage 36 and the area 44 where the roller 16 contacts a cage pocket end 46 at the first flange 36 and the second flange 40. This configuration provides minimal contact between the roller 16 and the cage pocket end 46.

FIG. 7 shows a cross-sectional view of a cage 48 pursuant to the present invention. The cage 48 has a roller 16 positioned in a cage pocket 52. The first flange 54 and the second flange 56 of the cage 48 have a contour so that a distance between the inner surfaces of the flanges 54, 56 is less than the length of the pocket 52, and, thus, in turn decrease the non-contact area between the ends 58, 60 of the roller 16 and the cage 48.

FIG. 8 shows an end view of the cage 48 with the area 62 where the roller 16 contacts the first flange 54 and the second flange 56, respectively. The contoured flanges 54, 56 increase the contact area between the ends 58, 60 of the roller 16 and ends of the cage pocket where a lubricant film is present. The inner faces 64, 66 of the flanges 54, 56 have a smooth surface in the contact area, which is an improvement from the pierced, shear zone surface of the existing bearing cages 10, 24, and 38.

Figures 9, 10:
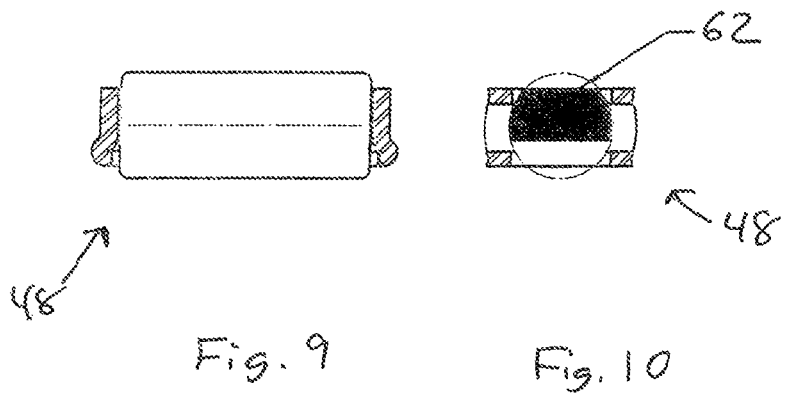
FIG. 9 is a cross-sectional view illustrating another embodiment of the inventive bearing cage.
FIG. 10 is an end view illustrating the bearing cage of FIG. 9 showing the area of the cage where the roller contacts the end of the cage.

FIGS. 9 and 10 show views similar to FIGS. 7 and 8, respectively of a W or U type cage having the contoured flanges of the present invention.

Figure 11:
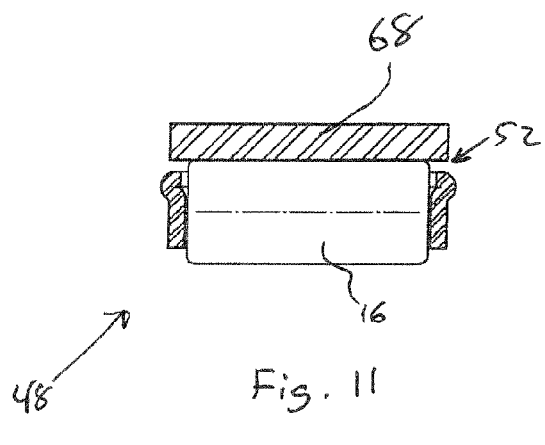
FIG. 11 is a view as in FIG. 7, with an outer ring.

FIG. 11 shows a cross-sectional view of the cage 48 a roller 16 positioned in the cage pocket 52, and an outer ring 68 supporting the rollers 16.

Figure 12:
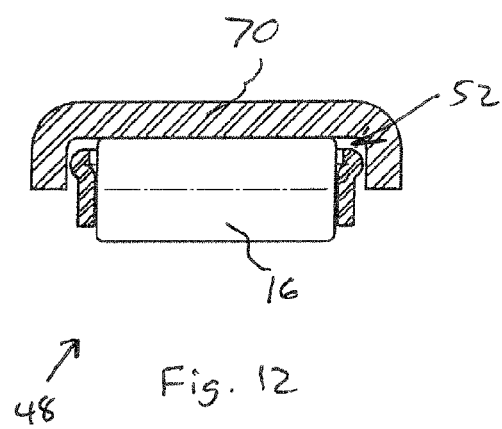
FIG. 12 is a view as in FIG. 7, with an outer drawn raceway.

FIG. 12 shows a cross-sectional view of the cage 48 with a roller 16 positioned in the cage pocket 52, and an outer drawn raceway 70 supporting the roller 16.

Figure 13:
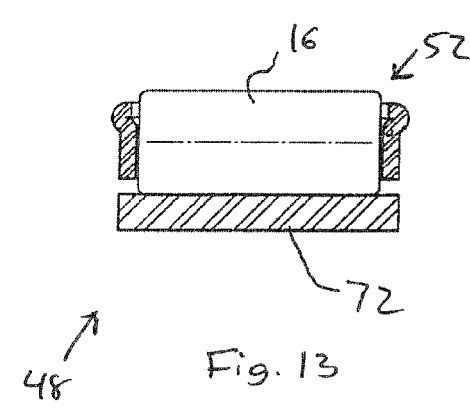
FIG. 13 is a view as in FIG. 7, with an inner ring.

FIG. 13 shows a cross-sectional view of the cage 48, a roller 16 positioned in the cage pocket 52, and an inner ring 72 supporting the roller 16.

Figure 14:
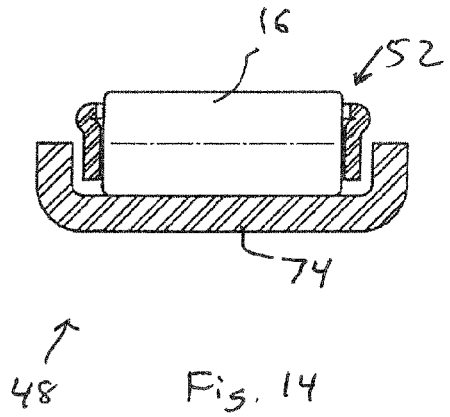
FIG. 14 is a view as in FIG. 7, with an inner drawn raceway.

FIG. 14 shows a cross-sectional view of the cage 50 with a roller 16 positioned in a cage pocket 52, and an inner drawn raceway 74 supporting the roller 16.

The present invention has been described with reference to a preferred embodiment. It should be understood that the scope of the present invention is defined by the claims and is not intended to be limited to the specific embodiment disclosed herein.

What is claimed:

1. A bearing cage, comprising:
   a first flange;
   a second flange; and
   a plurality of cage bars extending between the first flange and the second flange so as to form and define outer boundaries for a plurality of pockets, the first flange and the second flange defining axial ends of each of the pockets, the axial ends of each of the pockets being defined with respect to an axis of rotation of a roller receivable in the each of the pockets,
   the first flange and the second flange each having a first section being bent inward toward the pocket and a second section extending in a vertical direction from the first section to the end of the flange, the second sections of the first flange and the second flange extending parallel to each other in the vertical direction and forming contact surfaces.

2. The bearing cage of claim 1, wherein the bearing cage is a radial bearing cage.

3. The bearing cage of claim 1, further comprising rollers arranged in each of the pockets.

4. The bearing cage of claim 3, wherein the contact surfaces of the first flange and the second flange are contactable with the axial ends of the rollers.

5. The bearing cage of claim 3, wherein a lubricant film is present between the ends of the rollers and the contact surfaces.

6. The bearing cage of claim 1, wherein the first flange and the second flange each have an inner face and an outer face, the inner face having a smooth surface.

* * * * *